United States Patent
Lee et al.

(10) Patent No.: US 11,466,105 B2
(45) Date of Patent: Oct. 11, 2022

(54) PHOTOCURABLE ACRYLIC RESIN, ADHESIVE COMPOSITION INCLUDING THE SAME, AND ADHESIVE FILM FORMED USING THE ADHESIVE COMPOSITION

(71) Applicant: LG Chem, Ltd., Seoul (KR)

(72) Inventors: Min Ki Lee, Daejeon (KR); Jung Eun Woo, Daejeon (KR); Kee Young Kim, Daejeon (KR)

(73) Assignee: LG Chem, Ltd.

( * ) Notice: Subject to any disclaimer, the term of this patent is extended or adjusted under 35 U.S.C. 154(b) by 135 days.

(21) Appl. No.: 16/764,110

(22) PCT Filed: Oct. 24, 2018

(86) PCT No.: PCT/KR2018/012654
§ 371 (c)(1),
(2) Date: May 14, 2020

(87) PCT Pub. No.: WO2019/132211
PCT Pub. Date: Jul. 4, 2019

(65) Prior Publication Data
US 2020/0392267 A1    Dec. 17, 2020

(30) Foreign Application Priority Data

Dec. 27, 2017  (KR) .......................... 10-2017-0181614
Sep. 28, 2018  (KR) .......................... 10-2018-0116172

(51) Int. Cl.
| | |
|---|---|
| C08F 20/18 | (2006.01) |
| C09J 7/35 | (2018.01) |
| C08F 2/50 | (2006.01) |
| C08F 20/30 | (2006.01) |
| C09J 133/10 | (2006.01) |

(52) U.S. Cl.
CPC ............... *C08F 20/18* (2013.01); *C08F 2/50* (2013.01); *C08F 20/30* (2013.01); *C09J 7/35* (2018.01); *C09J 133/10* (2013.01)

(58) Field of Classification Search
CPC .. C08F 20/18; C08F 20/30; C08F 2/50; C08F 2/02; C08F 220/1804; C09J 7/35; C09J 7/10; C09J 133/10; C09J 133/08; C09J 133/062; C09J 133/06; C09J 2301/304; C09J 2301/312; C09D 133/062

USPC .................................................. 522/904, 905
See application file for complete search history.

(56) References Cited

U.S. PATENT DOCUMENTS

| | | | |
|---|---|---|---|
| 4,234,662 A | 11/1980 | Pastor et al. | |
| 5,073,611 A | 12/1991 | Rehmer et al. | |
| 5,389,699 A | 2/1995 | Rehmer et al. | |
| 8,871,827 B2 * | 10/2014 | Licht .................... | C09J 133/10 522/182 |
| 2004/0249186 A1 | 12/2004 | Balzer et al. | |
| 2009/0110849 A1 | 4/2009 | Nishina | |
| 2012/0315474 A1 | 12/2012 | Licht et al. | |
| 2015/0152297 A1 | 6/2015 | Zanzottera et al. | |
| 2017/0233617 A1 | 8/2017 | Lipscomb et al. | |
| 2018/0119180 A1 | 5/2018 | Kim et al. | |

FOREIGN PATENT DOCUMENTS

| | | |
|---|---|---|
| CN | 105198892 A | 12/2015 |
| CN | 106715495 A | 5/2017 |
| DE | 102012218335 A1 | 4/2013 |
| EP | 2718385 B1 | 3/2015 |
| JP | H05287250 A | 11/1993 |
| JP | 2006299017 A | 11/2006 |
| KR | 20080047436 A | 5/2008 |
| KR | 20170033015 A | 3/2017 |
| KR | 20170101339 A | 9/2017 |

OTHER PUBLICATIONS

International Search Report from Application No. PCT/KR2018/012654 dated Jan. 24, 2019, 2 pages.
Extended European Search Report including Written Opinion for Application No. 18894433.4 dated Jan. 19, 2021, 9 pages.
Chinese Search Report for Application No. 201880075359.1, dated Jul. 26, 2021, 2 pages.

* cited by examiner

*Primary Examiner* — Sanza L. McClendon
(74) *Attorney, Agent, or Firm* — Lerner, David, Littenberg, Krumholz & Mentlik, LLP

(57) ABSTRACT

The present invention relates to a photocurable acrylic resin which is a polymer of a monomer mixture including a crosslinkable monomer represented by [Formula 1]; a (meth)acrylic monomer including a photoinitiating functional group; and an alkyl (meth)acrylate-based monomer, and has a weight average molecular weight of 100,000 to 500,000, and a branch-type polymer structure, and an adhesive composition and an adhesive film including the same.

12 Claims, No Drawings

PHOTOCURABLE ACRYLIC RESIN, ADHESIVE COMPOSITION INCLUDING THE SAME, AND ADHESIVE FILM FORMED USING THE ADHESIVE COMPOSITION

CROSS-REFERENCE TO RELATED APPLICATIONS

The present application is a national phase entry under 35 U.S.C. § 371 of International Application No. PCT/KR2018/012654, filed Oct. 24, 2018, which claims priority to Korean Patent Application No. 10-2017-0181614, filed on Dec. 27, 2017, and Korean Patent Application No. 10-2018-0116172, filed on Sep. 28, 2018, the entire contents of which are incorporated herein by reference.

TECHNICAL FIELD

The present invention relates to a photocurable acrylic resin, an adhesive composition including the same, and an adhesive film formed using the adhesive composition.

BACKGROUND ART

Generally, a hot melt adhesive refers to an adhesive type obtained by applying a fluidized type via melting on a substrate and curing (solidifying) by cooling. The hot melt adhesive has a fast solidification rate and thus, has high workability and productivity, and has excellent adhesiveness to various materials. The hot melt adhesive is a solvent free-type adhesive, which does not use a volatile organic solvent, and is eco-friendly and applied in various fields. In addition, most hot melt adhesives use a thermoplastic resin as a raw material such as an ethylene-vinyl acetate copolymer (EVA), styrene isoprene styrene (SIS), styrene ethylene butadiene styrene (SEBS) and polypropylene (PP).

Meanwhile, the development of a photocurable acrylic adhesive which is capable of suitably controlling the sticky/adhesive properties through imparting the hot melt adhesive with photocuring performance and photocuring by irradiating UV, etc. in the atmosphere, has been tried. Particularly, in case of an acrylic resin, high transparency and heat resistance, and adhesiveness without mixing with a tackifying resin are achieved, and consistent studying and development thereon has been conducted.

For example, U.S. Pat. No. 5,389,699 (Patent Document 1) discloses a photocurable acrylic hot melt adhesive prepared by copolymerizing a monomer including a photoinitiation functional group and an acrylamide group such as benzophenone and a (meth)acrylic monomer, and US Laid-open Patent No. 2004-0249186 (Patent Document 2) discloses a photocurable acrylic adhesive prepared by copolymerizing an acetophenone or benzophenone derivative including an isocyanate functional group with a (meth)acrylic monomer including an isocyanate group.

In addition, U.S. Pat. No. 8,871,827 (Patent Document 3) discloses a photocurable acrylic adhesive including poly(meth)acrylate, an oligomer including nonacrylic carbon-carbon double bonds and having a Fikentscher K value of 20 or less, and a photoinitiator.

However, the photocurable acrylic adhesive of Patent Documents 1 and 2 have limitations of having a high viscosity and difficulty in applying to the processing process of the conventional hot melt adhesive, and having insufficient photocurable efficiency and sticky/adhesive properties. In addition, the photocurable acrylic adhesive of Patent Document 3 has advantages of including an oligomer having a low weight average molecular weight and having a relatively low viscosity. However, since the poly(meth)acrylate and the oligomer are required to be polymerized separately and then blended, the preparation is inconvenient and sticky/adhesive properties or thermal stability are deteriorated due to the presence of the oligomer with a small molecular weight.

Therefore, the development of a photocurable acrylic adhesive having excellent sticky/adhesive properties and thermal stability, as well as a low viscosity and excellent processability, is required.

DISCLOSURE OF THE INVENTION

Technical Problem

The present invention is to solve the above-mentioned limitations and provides a photocurable acrylic resin which is photocurable, has excellent sticky/adhesive properties and thermal stability and low viscosity properties, and an adhesive composition and an adhesive film including the same.

Technical Solution

In an aspect, there is provided in the present invention a photocurable acrylic resin which is a polymer of a monomer mixture including a crosslinkable monomer represented by the following [Formula 1]; a (meth)acrylic monomer including a photoinitiating functional group; and an alkyl (meth)acrylate-based monomer, and has a weight average molecular weight of 100,000 to 500,000 and a branch-type polymer structure:

$$R^1—CH=CR^2—(C=O)—O—X—Y \quad \text{[Formula 1]}$$

in Formula 1, $R^1$ is hydrogen, a C1-C6 alkyl group or a C2-C6 alkenyl group, $R^2$ is hydrogen or a C1-C10 alkyl group, X is a single bond, a C1-C10 alkylene group, a C2-C10 alkenylene group, ether, ester, or a combination thereof, and Y is a vinyl group, an allyl group, or a C3-C10 cycloalkenyl group.

In another aspect, there is provided in the present invention an adhesive composition including the photocurable acrylic resin according to the present invention.

In another aspect, there is provided in the present invention an adhesive film including an adhesive layer formed using the adhesive composition according to the present invention.

Advantageous Effects

The acrylic resin according to the present invention uses a monomer which may have two or more radical reacting groups and has a branch-type polymer structure, and thus, has lower viscosity properties when compared with a linear polymer resin having an equivalent degree of a weight average molecular weight.

In addition, the acrylic resin according to the present invention includes a unit derived from a (meth)acrylic monomer including a photoinitiating functional group, and is photocurable without adding a separate photoinitiator, and sticky/adhesive properties may be easily controlled by controlling photocuring degree via the change of the component ratio of the monomer or a light amount.

The adhesive composition in which the acrylic resin is applied according to the present invention has excellent processability and coatability at a low temperature of 100 to 130 degrees, and does not require the repair and replacement of an apparatus or equipment for processing and additional processes, and thus, may be applied to the processing process of the conventional hot melt adhesive composition as it is.

In addition, since the adhesive composition according to the present invention uses only one kind of an acrylic resin, a process for blending, etc. is not required and the preparation method thereof is simplified.

BEST MODE FOR CARRYING OUT THE INVENTION

Hereinafter, the present invention will be described in more detail.

The terms "comprise", "having", "comprised of", etc. referred to in the disclosure do not preclude the addition or other parts unless otherwise used with "only". A constituent element expressed by a singular form is intended to include the plural forms as well, unless the context clearly indicates otherwise.

Constituent elements are interpreted to include a margin of error though it is not clearly indicated in the context.

In the disclosure, "(meth)acryl" is a general term of acryl or methacryl. For example, (meth)acrylate includes methacrylate and acrylate, and (meth)acrylic acid includes acrylic acid and methacrylic acid.

In the disclosure, "X to Y" representing a range means "from X or more to Y and less".

In the disclosure, "weight average molecular weight (Mw)" means a conversion value with respect to a standard polystyrene measured by gel permeation chromatography (GPC).

In the disclosure, "branch-type polymer structure" means a polymer structure having two or more long chains which are propagated in different directions to each other.

Photocurable Acrylic Resin

Hereinafter, the photocurable acrylic resin according to the present invention will be explained in particular.

The photocurable acrylic resin according to the present invention includes a polymer obtained by polymerizing a monomer mixture including (1) a crosslinkable monomer represented by the following [Formula 1]; (2) a (meth)acrylic monomer including a photoinitiating functional group; and (3) an alkyl (meth)acrylate-based monomer:

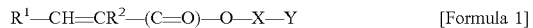

[Formula 1]

in Formula 1, $R^1$ is hydrogen, a C1-C6 alkyl group or a C2-C6 alkenyl group, $R^2$ is hydrogen or a C1-C10 alkyl group, X is a single bond, a C1-C10 alkylene group, a C2-C10 alkenylene group, ether, ester, or a combination thereof, and Y is a vinyl group, an allyl group, or a C3-C10 cycloalkenyl group.

The crosslinkable monomer represented by [Formula 1] is for forming a branch-type polymer structure. Particularly, the monomer of [formula 1] includes two or more ethylene groups and each may produce radical in free radical polymerization, and thus, chains may be propagated in different directions, thereby forming a branch-type polymer having two or more chains having different propagation directions.

The crosslinkable monomer represented by [Formula 1] may be one or more selected from the group consisting of allyl methacrylate, allyl acrylate, methallyl methacrylate, methallyl acrylate, 3-butenyl acrylate, but-3-enyl-2-methyl-prop-2-enoate, 2-allyloxyethyl acrylate, 2-allyloxyethyl methacrylate, 3-allyloxypropyl methacrylate, 3-allyloxypropyl acrylate, 2-allyloxyethoxyethyl methacrylate, 2-allyloxyethoxyethyl acrylate, cyclohex-2-enyl acrylate, cyclohex-2-en-1-yl 2-methylprop-2-enoate and 3-vinylcyclohex-2-enyl acrylate, without limitation.

The monomer represented by [Formula 1] may be included in 0.01 to 3 parts by weight, preferably, 0.05 to 2 parts by weight, more preferably, 0.1 to 1 parts by weight with respect to 100 parts by weight of the monomer mixture. If the amount of the monomer represented by [Formula 1] is less than 0.01 parts by weight, a resin having low viscosity properties may be difficult to obtain, and if the amount is greater than 3 parts by weight, crosslinking reaction is performed during carrying out polymerization reaction, and the control of the increase of a molecular weight and viscosity is difficult.

Then, the (meth)acrylic monomer including a photoinitiating functional group is for imparting the acrylic resin with photocurability. If such a photoinitiating functional group is included, photocuring may be possible without adding a separate photoinitiator, and photocuring degree may be controlled to easily control the sticky/adhesive properties of the acrylic resin.

As the (meth)acrylate-based monomer including the photoinitiating functional group, a functional group capable of initiating photocuring, for example, a (meth)acrylate-based monomer including benzophenone, acetophenone, benzoin, etc. may be used, and particularly, one or more selected from the group consisting of a benzophenone-based (meth)acrylate-based monomer and a benzoin-based (meth)acrylate-based monomer may be used. Particular examples may include 4-acryloyloxy benzophenone, 4-methacryloyloxy benzophenone, 2-(4-benzoylphenoxy) ethyl prop-2-enoate, 2-(4-benzoylphenoxy)ethyl 2-methyl prop-2-enoate, 4-(4-benzoylphenoxy) butyl prop-2-enoate), (2-oxo-1,2-diphenylethyl) prop-2-enoate, 2-propenoic acid, 1,1-dimethyl-2-oxo-2-phenyl ethyl ester, 2-propenoic acid, 2-methyl-, 1,1-dimethyl-2-oxo-2-phenyl ethyl ester, 2-(acryloyloxy)ethyl 4-(4-chlorobenzoyl)benzoate, etc.

The (meth)acrylate-based monomer including a photoinitiating functional group may be included in 0.01 to 5 parts by weight, preferably, 0.05 to 3 parts by weight, more preferably, 0.1 to 2 parts by weight with respect to 100 parts by weight of the monomer mixture. If the amount of the (meth)acrylate-based monomer including a photoinitiating functional group is less than 0.01 parts by weight, photocuring may not be smooth, and if the amount is greater than 5 parts by weight, the adhesive may be hardened due to excessive curing density and adhesiveness may be degraded.

Then, the alkyl (meth)acrylate-based monomer may preferably include an alkyl group of 1 to 14 carbon atoms. If the alkyl group included in the alkyl (meth)acrylate-based monomer is too long, cohesiveness during forming an adhesive layer is degraded, and the control of the glass transition temperature (Tg) or adhesiveness become difficult. Examples of the alkyl (meth)acrylate-based monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate, and one among the monomers or a mixture of two or more thereof may be used in the present invention.

The alkyl (meth)acrylate-based monomer may be included in an amount of 72 to 99 parts by weight, for example, 72 to 98 parts by weight, 92 to 99 parts by weight, 80 to 98 parts by weight or 85 to 96 parts by weight with respect to 100 parts by weight of the monomer mixture. If the amount of the alkyl (meth)acrylate-based monomer satisfies the above-mentioned range, excellent adhesiveness and durability may be achieved.

Meanwhile, the monomer mixture may further include a (meth)acrylic monomer having a polar functional group as necessary.

The (meth)acrylic monomer having a polar functional group is for improving adhesiveness and cohesiveness, and may include, for example, a hydroxyl group-containing monomer, a carboxyl group-containing monomer or a nitrogen-containing monomer, without limitation. Particular examples of the hydroxyl group-containing monomer may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, or 2-hydroxypropylene glycol (meth)acrylate, examples of the carboxyl group-containing monomer may include (meth)acrylic acid, 2-(meth)acryloyloxy acetic acid, 3-(meth)acryloyloxy propyl acid, 4-(meth)acryloyloxy butyl acid, an acrylic acid dimer, itaconic acid, maleic acid and maleic anhydride, and examples of the nitrogen-containing monomer may include (meth)acrylamide, N-vinyl pyrrolidone or N-vinyl caprolactam, without limitation.

The (meth)acrylic monomer having a polar functional group may be included in an amount of 0.1 to 20 parts by weight, preferably, 0.5 to 15 parts by weight, more preferably, 1 to 10 parts by weight with respect to 100 parts by weight of the monomer mixture. If the amount of the (meth)acrylic monomer having a polar functional group satisfies the above-mentioned range, even better adhesiveness, cohesiveness and durability may be achieved.

According to an embodiment, the monomer mixture may include 0.01 to 3 parts by weight of the monomer represented by [Formula 1]; 0.01 to 5 parts by weight of the (meth)acrylic monomer including the photoinitiating functional group; and 92 to 99 parts by weight of the alkyl (meth)acrylate-based monomer with respect to 100 parts by weight of the monomer mixture.

According to another embodiment, the monomer mixture may include 0.01 to 3 parts by weight of the monomer represented by [Formula 1]; 0.01 to 5 parts by weight of the (meth)acrylic monomer including the photoinitiating functional group; 0.1 to 20 parts by weight of a (meth)acrylic monomer having a polar functional group; and 72 to 98 parts by weight of the alkyl (meth)acrylate-based monomer with respect to 100 parts by weight of the monomer mixture.

The acrylic resin according to the present invention may be prepared by mixing each of the monomers to prepare a monomer mixture and then polymerizing. In this case, a polymerization method is not specifically limited, and various polymerization methods known in the art, for example, solution polymerization, photopolymerization, bulk polymerization, suspension polymerization or emulsion polymerization may be used. During polymerizing, a polymerization initiator, a molecular weight controlling agent, etc. may be additionally added, and the injection point of each component is not specifically limited. That is, the components may be injected in batch or injected in installments over several times.

In the present invention, particularly, an acrylic resin may be prepared using the solution polymerization method, and the solution polymerization may preferably be performed by adding an initiator, a molecular weight controlling agent, etc. to a uniformly mixed state of each monomer at a polymerization temperature of 50° C. to 140° C. Examples of the initiator used in the process may include an azo-based initiator such as azobisisobutyronitrile and azobiscyclohexane carbonitrile; and/or a common initiator such as a peroxide such as benzoyl peroxide and acetyl peroxide, and one among the initiators or a mixture of two or more thereof may be used, without limitation. In addition, the molecular weight controlling agent may include mercaptans such as t-dodecyl mercaptan and n-dodecyl mercaptan, terpenes such as dipentene and t-terpene, halogenated hydrocarbon such as chloroform and carbon tetrachloride, and pentaerythritol tetrakis(3-mercapto propionate), etc., without limitation.

The acrylic resin of the present invention, prepared by polymerizing the monomer mixture including the above-mentioned monomer components has a branch-type polymer structure. Since a polymer resin having a branch-type polymer structure has a lower viscosity than a polymer resin having a linear structure and an equivalent degree of weight average molecular weight, excellent processability and coatability may be achieved.

In this case, the polymer structure of the acrylic resin was evaluated through a method below. First, a monomer mixture was prepared by mixing an alkyl (meth)acrylate-based monomer which was the same kind used in an acrylic resin for evaluating a polymer structure (hereinafter, will be referred to as "evaluation target resin"), a (meth)acrylic monomer having a photoinitiating functional group, and selectively a (meth)acrylic monomer having a polar functional group, and the monomer mixture was polymerized to prepare an acrylic resin (hereinafter, will be referred to as "reference resin") having the equivalent level of weight average molecular weight (margin of error±5%) as the evaluation target resin. In this case, the monomer mixture for preparing the reference resin included the same amounts of the (meth)acrylic monomer having a photoinitiating functional group and a (meth)acrylic monomer having a polar functional group as in the evaluation target resin.

After that, an ethyl acetate solvent was added to each of the reference resin and the evaluation target resin so that the concentration of the solid content became 58 wt %, and a viscosity at 23° C. was measured. Then, the viscosities of the measured evaluation target resin and the reference resin were compared, and in case where the viscosity of the evaluation target resin was lower by 30% or more than the reference resin, the evaluation target resin was evaluated as having a branch-type polymer structure, and as for the rest, the evaluation target resin was evaluated as having a linear polymer structure.

Particularly, the acrylic resin having the branch-type polymer structure of the present invention may have a viscosity (dilution viscosity) measured at 23° C. of 8,000 cP or less, preferably, 3,000 cP to 8,000 cP, more preferably, 3,000 cP to 7,000 cP, after adding ethyl acetate to dilute to a solid content concentration of 58 wt %. In this case, the viscosity was measured using a Brookfield viscometer (KVDV2T, manufacturer: Brookfield) under the rpm conditions when torque of 20% (±2%) was measured using a KV-05 spindle.

Meanwhile, the acrylic resin of the present invention may have a weight average molecular weight of 100,000 to 500,000, preferably, 150,000 to 300,000. If the weight average molecular weight of the acrylic resin is less than 100,000, curing degree may be low and cohesiveness may be degraded, and if the weight average molecular weight is greater than 500,000, viscosity may increase and solvent free coating may become impossible, and thus, the use as a hot melt adhesive may be difficult.

Meanwhile, the weight average molecular weight is a conversion value of a measured value using GPC by the conditions below, and a standard polystyrene of Agilent system was used for the formation of a calibration curve.

Measurement Conditions

Measuring instrument: Agilent GPC (Agulent 1200 series, USA)
Column: two of PL Mixed B columns were connected
Column temperature: 40° C.
Eluent: tetrahydrofuran
Flowing rate: 1.0 ml/min
Concentration: ~1 mg/ml (100 μL injection)

Adhesive Composition

Then, the adhesive composition according to the present invention will be explained.

The adhesive composition according to the present invention includes the photocurable acrylic resin according to the present invention. Particularly, the adhesive composition according to the present invention may include 90 wt % or more, preferably, 95 wt % to 100 wt % of the photocurable acrylic resin according to the present invention. The adhesive composition of the present invention, including 90 wt % or more of the photocurable acrylic resin has a low coating viscosity, excellent coatability, and excellent cohesive and adhesive properties after forming an adhesive layer, and shows little agglomeration at a high temperature and excellent thermal stability.

Such adhesive composition according to the present invention may be prepared by, for example, removing a polymerization solvent or an unreacted monomer from the photocurable acrylic resin according to the present invention, without limitation. In this case, a process for removing the polymerization solvent may be performed by, for example, heating a polymerization product including an acrylic resin at 110 to 150° C. under a reduced pressure.

The adhesive composition thus prepared according to the present invention may be a solvent free adhesive composition having the solid content of 99 wt % or more, and preferably, the adhesive composition may be a hot melt adhesive composition.

The adhesive composition according to the present invention has low viscosity properties, particularly, low viscosity properties at the melting temperature of the acrylic resin, for example, a temperature of 120° C. or more. Particularly, the adhesive composition of the present invention may have a viscosity of about 20 to 140 Pa·s, for example, 20 to 120 Pa·s, 60 to 110 Pa·s, or 60 to 100 Pa·s. In this case, the viscosity was measured using a Brookfield viscometer (RVDV2T, manufacturer: Brookfield) under 0.7 rpm conditions using a SC4-27 spindle.

In addition, the adhesive composition according to the present invention includes a photoinitiating functional group in an acrylic resin, and may be cured by light irradiation after applying the adhesive composition. In this case, the sticky/adhesive properties may be easily controlled by controlling the light irradiation degree.

In addition, since the adhesive composition according to the present invention utilizes the acrylic resin of the present invention, which has a sufficiently low viscosity in itself, a separate component such as a low molecular weight resin for decreasing viscosity is not required to be added. Accordingly, a separate process for mixing an additional component is not required, and a preparation process is simple. In addition, defects of degrading sticky/adhesive properties due to the mixing of a low molecular weight resin, degradation of thermal stability and/or gelation do not occur. Particularly, the adhesive composition according to the present invention has the number of gel particles of less than 7, if measured after aging at 150° C. for 24 hours.

Adhesive Film

Next, the adhesive film according to the present invention will be explained.

The adhesive film of the present invention includes an adhesive layer formed using the adhesive composition of the present invention. For example, the adhesive film may include a base, and adhesive layers formed on one side or both sides of the base. In this case, the adhesive layer is formed by the adhesive composition of the present invention.

Particularly, the adhesive layer may be prepared by heating and melting the adhesive composition of the present invention, applying the same on a base and irradiating light such as ultraviolet rays (UV) for photocuring.

In this case, the heating temperature may be suitably controlled according to the melting point of the acrylic resin included in the adhesive composition according to the present invention, and may be, for example, 90° C. or more, or about 90° C. to 140° C.

In addition, the irradiation intensity and time of the light may be appropriately controlled according to the physical properties of a target adhesive layer. For example, the light irradiation may be performed with an irradiation amount of 10 mJ/cm$^2$ to 60 mJ/cm$^2$, without limitation.

Meanwhile, bases of diverse materials may be used as the base, and the kind thereof is not specifically limited. For example, the base may use paper, or a polymer film such as a polyolefin-based film, a polyester-based film, an acrylic film, a cellulose-based film, and a vinyl chloride-based film.

The adhesive film formed using the adhesive composition of the present invention is simply formed and has an adhesive layer having excellent cohesiveness and adhesiveness, and thus may be usefully used in various fields.

Mode for Carrying Out the Invention

Hereinafter, embodiments of the present invention will be explained in detail so that a person skilled in the art may easily perform. The present invention may be modified into various other types, but should not be limited to the embodiments described below.

Preparation Example 1: Preparation of Acrylic Resin A

To a 3 L reactor in which a nitrogen gas was refluxed and on which a cooling apparatus for easy control of the temperature was installed, a monomer mixture including 57.4 parts by weight of n-butyl acrylate, 25.5 parts by weight of 2-ethyl hexyl acrylate, 15 parts by weight of methyl acrylate, 1 part by weight of acrylic acid, 0.5 parts by weight of allyl methacrylate, and 0.4 parts by weight of 4-methacryloyloxy benzophenone, and 60 parts by weight of ethyl acetate (EAc) were injected. Then, a nitrogen gas was purged for 60 minutes to remove oxygen, and the temperature was kept to 70° C. After that, reaction was performed for 7 hours while additionally injecting 0.49 parts by weight of n-dodecyl mercaptan (n-DDM) as a molecular weight controller, 0.27 parts by weight of 2,2'-azobis(2,4-dimethylvaleronitrile)

(V-65, manufacturer: Wako) as a polymerization initiator, and 0.2 parts by weight of allyl methacrylate. In this case, the allyl methacrylate was injected after 90 minutes from the initiation of the reaction, and the molecular weight controlling agent and the polymerization initiator were injected in installments for 4 hours from the initiation of the reaction.

According to the method, an acrylic resin A having a branch-type polymer structure, a weight average molecular weight of 209,000 g/mol, and a viscosity at 23° C. of 4,100 cP when the solid content was 58 wt %, was prepared.

Preparation Example 2: Preparation of Acrylic Resin B

To a 3 L reactor in which a nitrogen gas was refluxed and on which a cooling apparatus for easy control of the temperature was installed, a monomer mixture including 58.1 parts by weight of n-butyl acrylate, 25.5 parts by weight of 2-ethyl hexyl acrylate, 15 parts by weight of methyl acrylate, 1 part by weight of acrylic acid, and 0.4 parts by weight of 4-methacryloyloxy benzophenone, and 60 parts by weight of ethyl acetate (EAc) were injected. Then, a nitrogen gas was purged for 60 minutes to remove oxygen, and the temperature was kept to 70° C. After that, reaction was performed for 7 hours while additionally injecting 0.38 parts by weight of n-dodecyl mercaptan (n-DDM) as a molecular weight controller, and 0.25 parts by weight of 2,2'-azobis(2,4-dimethylvaleronitrile) (V-65, manufacturer: Wako) as a polymerization initiator. In this case, the molecular weight controlling agent and the polymerization initiator were injected in installments for 4 hours from the initiation of the reaction.

According to the method, an acrylic resin B having a linear polymer structure, a weight average molecular weight of 212,000 g/mol, and a viscosity at 23° C. of 12,000 cP when the solid content was 58 wt %, was prepared.

Preparation Example 3: Preparation of Acrylic Resin C

To a 3 L reactor in which a nitrogen gas was refluxed and on which a cooling apparatus for easy control of the temperature was installed, a monomer mixture including 58.1 parts by weight of n-butyl acrylate, 25.5 parts by weight of 2-ethyl hexyl acrylate, 15 parts by weight of methyl acrylate, 1 part by weight of acrylic acid, and 0.4 parts by weight of 4-methacryloyloxy benzophenone, and 60 parts by weight of ethyl acetate (EAc) were injected. Then, a nitrogen gas was purged for 60 minutes to remove oxygen, and the temperature was kept to 70° C. After that, reaction was performed for 7 hours while additionally injecting 5 parts by weight of n-dodecyl mercaptan (n-DDM) as a molecular weight controller, and 0.27 parts by weight of 2,2'-azobis(2,4-dimethylvaleronitrile) (V-65, manufacturer: Wako) as a polymerization initiator. In this case, the molecular weight controlling agent and the polymerization initiator were injected in installments for 4 hours from the initiation of the reaction.

According to the method, an acrylic resin C having a linear polymer structure and a weight average molecular weight of 9,600 g/mol, was prepared.

Preparation Example 4: Preparation of Acrylic Resin D

To a 3 L reactor in which a nitrogen gas was refluxed and on which a cooling apparatus for easy control of the temperature was installed, a monomer mixture including 53.1 parts by weight of n-butyl acrylate, 25.5 parts by weight of 2-ethyl hexyl acrylate, 15 parts by weight of methyl acrylate, 1 part by weight of acrylic acid, 3 parts by weight of allyl methacrylate, and 0.4 parts by weight of 4-methacryloyloxy benzophenone, and 60 parts by weight of ethyl acetate (EAc) were injected. Then, a nitrogen gas was purged for 60 minutes to remove oxygen, and the temperature was kept to 70° C. After that, reaction was performed for 7 hours while additionally injecting 7.8 parts by weight of n-dodecyl mercaptan (n-DDM) as a molecular weight controller, 0.27 parts by weight of 2,2'-azobis(2,4-dimethylvaleronitrile) (V-65, manufacturer: Wako) as a polymerization initiator, and 2 parts by weight of allyl methacrylate. In this case, the allyl methacrylate was injected after 90 minutes from the initiation of the reaction, and the molecular weight controlling agent and the polymerization initiator were injected in installments for 4 hours from the initiation of the reaction.

According to the method, an acrylic resin D having a branch-type polymer structure and a weight average molecular weight of 10,300 g/mol, was prepared.

Preparation Example 5: Preparation of Acrylic Resin E

To a 3 L reactor in which a nitrogen gas was refluxed and on which a cooling apparatus for easy control of the temperature was installed, a monomer mixture including 57.44 parts by weight of n-butyl acrylate, 25.5 parts by weight of 2-ethyl hexyl acrylate, 15 parts by weight of methyl acrylate, 1 part by weight of acrylic acid, 0.5 parts by weight of allyl methacrylate, and 0.36 parts by weight of 4-methacryloyloxy benzophenone, and 60 parts by weight of ethyl acetate (EAc) were injected. Then, a nitrogen gas was purged for 60 minutes to remove oxygen, and the temperature was kept to 70° C. After that, reaction was performed for 7 hours while additionally injecting 0.43 parts by weight of n-dodecyl mercaptan (n-DDM) as a molecular weight controller, 0.27 parts by weight of 2,2'-azobis(2,4-dimethylvaleronitrile) (V-65, manufacturer: Wako) as a polymerization initiator, and 0.2 parts by weight of allyl methacrylate. In this case, the allyl methacrylate was injected after 90 minutes from the initiation of the reaction, and the molecular weight controlling agent and the polymerization initiator were injected in installments for 4 hours from the initiation of the reaction.

According to the method, an acrylic resin E having a branch-type polymer structure, a weight average molecular weight of 336,000 g/mol, and a viscosity at 23° C. of 6,300 cP when the solid content was 58 wt %, was prepared.

Preparation Example 6: Preparation of Acrylic Resin F

To a 3 L reactor in which a nitrogen gas was refluxed and on which a cooling apparatus for easy control of the temperature was installed, a monomer mixture including 62.88 parts by weight of n-butyl acrylate, 21 parts by weight of 2-ethyl hexyl acrylate, 15 parts by weight of methyl acrylate, 0.5 parts by weight of allyl methacrylate, and 0.42 parts by weight of 4-methacryloyloxy benzophenone, and 60 parts by weight of ethyl acetate (EAc) were injected. Then, a nitrogen gas was purged for 60 minutes to remove oxygen, and the temperature was kept to 70° C. After that, reaction was performed for 7 hours while additionally injecting 0.49 parts by weight of n-dodecyl mercaptan (n-DDM) as a molecular weight controller, 0.27 parts by weight of 2,2'-azobis(2,4-dimethylvaleronitrile) (V-65, manufacturer: Wako) as a polymerization initiator, and 0.2 parts by weight of allyl methacrylate. In this case, the allyl methacrylate was injected after 90 minutes from the initiation of the reaction, and the molecular weight controlling agent and the polymerization initiator were injected in installments for 4 hours from the initiation of the reaction.

According to the method, an acrylic resin F having a branch-type polymer structure, a weight average molecular weight of 210,000 g/mol, and a viscosity at 23° C. of 4,300 cP when the solid content was 58 wt %, was prepared.

Preparation Example 7: Preparation of Acrylic Resin G

To a 3 L reactor in which a nitrogen gas was refluxed and on which a cooling apparatus for easy control of the temperature was installed, a monomer mixture including 57.3 parts by weight of n-butyl acrylate, 25.5 parts by weight of 2-ethyl hexyl acrylate, 15 parts by weight of methyl acrylate, 1 part by weight of acrylic acid, 0.5 parts by weight of allyl methacrylate, and 0.5 parts by weight of 4-(4-benzoylphenoxy)butyl prop-2-enoate, and 60 parts by weight of ethyl acetate (EAc) were injected. Then, a nitrogen gas was purged for 60 minutes to remove oxygen, and the temperature was kept to 70° C. After that, reaction was performed for 7 hours while additionally injecting 0.49 parts by weight of n-dodecyl mercaptan (n-DDM) as a molecular weight controller, 0.27 parts by weight of 2,2'-azobis(2,4-dimethylvaleronitrile) (V-65, manufacturer: Wako) as a polymerization initiator, and 0.2 parts by weight of allyl methacrylate. In this case, the allyl methacrylate was injected after 90 minutes from the initiation of the reaction, and the molecular weight controlling agent and the polymerization initiator were injected in installments for 4 hours from the initiation of the reaction.

According to the method, an acrylic resin G having a branch-type polymer structure, a weight average molecular weight of 195,000 g/mol, and a viscosity at 23° C. of 3,900 cP when the solid content was 58 wt %, was prepared.

Preparation Example 8: Preparation of Acrylic Resin H

To a 3 L reactor in which a nitrogen gas was refluxed and on which a cooling apparatus for easy control of the temperature was installed, a monomer mixture including 57.4 parts by weight of n-butyl acrylate, 25.5 parts by weight of 2-ethyl hexyl acrylate, 15 parts by weight of methyl acrylate, 1 part by weight of acrylic acid, 0.5 parts by weight of methallyl acrylate, and 0.4 parts by weight of 4-methacryloyloxy benzophenone, and 60 parts by weight of ethyl acetate (EAc) were injected. Then, a nitrogen gas was purged for 60 minutes to remove oxygen, and the temperature was kept to 70° C. After that, reaction was performed for 7 hours while additionally injecting 0.49 parts by weight of n-dodecyl mercaptan (n-DDM) as a molecular weight controller, 0.27 parts by weight of 2,2'-azobis(2,4-dimethylvaleronitrile) (V-65, manufacturer: Wako) as a polymerization initiator, and 0.2 parts by weight of methallyl acrylate. In this case, the methallyl acrylate was injected after 90 minutes from the initiation of the reaction, and the molecular weight controlling agent and the polymerization initiator were injected in installments for 4 hours from the initiation of the reaction.

According to the method, an acrylic resin H having a branch-type polymer structure, a weight average molecular weight of 228,000 g/mol, and a viscosity at 23° C. of 5,200 cP when the solid content was 58 wt %, was prepared.

Preparation Example 9: Preparation of Acrylic Resin I

To a 3 L reactor in which a nitrogen gas was refluxed and on which a cooling apparatus for easy control of the temperature was installed, a monomer mixture including 57.23 parts by weight of n-butyl acrylate, 25.5 parts by weight of 2-ethyl hexyl acrylate, 15 parts by weight of methyl acrylate, 1 part by weight of acrylic acid, 0.62 parts by weight of 2-allyloxyethyl acrylate, and 0.4 parts by weight of 4-methacryloyloxy benzophenone, and 60 parts by weight of ethyl acetate (EAc) were injected. Then, a nitrogen gas was purged for 60 minutes to remove oxygen, and the temperature was kept to 70° C. After that, reaction was performed for 7 hours while additionally injecting 0.49 parts by weight of n-dodecyl mercaptan (n-DDM) as a molecular weight controller, 0.27 parts by weight of 2,2'-azobis(2,4-dimethylvaleronitrile) (V-65, manufacturer: Wako) as a polymerization initiator, and 0.2 parts by weight of 2-allyloxyethyl acrylate. In this case, the 2-allyloxyethyl acrylate was injected after 90 minutes from the initiation of the reaction, and the molecular weight controlling agent and the polymerization initiator were injected in installments for 4 hours from the initiation of the reaction.

According to the method, an acrylic resin I having a branch-type polymer structure, a weight average molecular weight of 202,000 g/mol, and a viscosity at 23° C. of 4,000 cP when the solid content was 58 wt %, was prepared.

The monomer compositions of the acrylic resins A-I prepared by Preparation Examples 1-9 are shown in [Table 1] below.

TABLE 1

| | | Preparation Example | | | | | | | | |
|---|---|---|---|---|---|---|---|---|---|---|
| | | 1 | 2 | 3 | 4 | 5 | 6 | 7 | 8 | 9 |
| Acrylic resin | | A | B | C | D | E | F | G | H | I |
| Component [parts by weight] | A-1 | 57.40 | 58.10 | 58.10 | 53.10 | 57.44 | 62.88 | 57.30 | 57.40 | 57.23 |
| | A-2 | 25.50 | 25.50 | 25.50 | 25.50 | 25.50 | 21.00 | 25.50 | 25.50 | 25.50 |
| | A-3 | 15.00 | 15.00 | 15.00 | 15.00 | 15.00 | 15.00 | 15.00 | 15.00 | 15.00 |
| | B | 1.00 | 1.00 | 1.00 | 1.00 | 1.00 | — | 1.00 | 1.00 | 1.00 |
| | C-1 | 0.70 | — | — | 5.00 | 0.70 | 0.70 | 0.70 | 0.00 | — |
| | C-2 | — | — | — | — | — | — | — | 0.70 | — |
| | C-3 | — | — | — | — | — | — | — | — | 0.87 |
| | D-1 | 0.40 | 0.40 | 0.40 | 0.40 | 0.36 | 0.42 | — | 0.40 | 0.40 |
| | D-2 | — | — | — | — | — | — | 0.50 | — | — |

TABLE 1-continued

| Acrylic resin | | Preparation Example | | | | | | | | |
|---|---|---|---|---|---|---|---|---|---|---|
| | | 1 A | 2 B | 3 C | 4 D | 5 E | 6 F | 7 G | 8 H | 9 I |
| Physical properties | Weight average molecular weight [g/mol] | 209,000 | 212,000 | 9,600 | 10,300 | 336,000 | 210,000 | 195,000 | 228,000 | 202,000 |
| | Viscosity at solid content of 58 wt % [cP] | 4,100 | 12,000 | — | — | 6,300 | 4,300 | 3,900 | 5,200 | 4,000 |

A-1: n-butyl acrylate
A-2: 2-ethylhexyl acrylate
A-3: methyl acrylate
B: acrylic acid
C-1: allyl methacrylate
C-2: methallyl acrylate
C-3: 2-allyloxyethyl acrylate
D-1: 4-methacryloyloxy benzophenone
D-2: 4-(4-benzoylphenoxy)butyl prop-2-enoate Example 1

The acrylic resin A prepared by Preparation Example 1 was heated to 130° C. under a reduced pressure atmosphere to volatilize a polymerization solvent to prepare an adhesive composition including the acrylic resin A. The solid content of the adhesive composition was 99 wt % or more.

Comparative Example 1

The acrylic resin B prepared by Preparation Example 2 was heated to 130° C. under a reduced pressure atmosphere to volatilize a polymerization solvent to prepare an adhesive composition including the acrylic resin B. The solid content of the adhesive composition was 99 wt % or more.

Comparative Example 2

A linear acrylic resin mixture having a viscosity at 23° C. of 5,000 cP when the solid content was 58 wt %, was prepared by mixing the linear acrylic resin B prepared in Preparation Example 2 and the linear acrylic resin C having a low molecular weight, prepared in Preparation Example 3 in a weight ratio of 75:25.
Then, the linear acrylic resin mixture was heated to 130° C. under a reduced pressure atmosphere to volatilize a polymerization solvent to prepare an adhesive composition including the acrylic resins B and C. The solid content of the adhesive composition was 99 wt % or more.

Comparative Example 3

An acrylic resin mixture having a viscosity at 23° C. of 4,300 cP when the solid content was 58 wt %, was prepared by mixing the linear acrylic resin B prepared in Preparation Example 2 and the branch-type acrylic resin D having a low molecular weight, prepared in Preparation Example 4 in a weight ratio of 75:25.
Then, the acrylic resin mixture was heated to 130° C. under a reduced pressure atmosphere to volatilize a polymerization solvent to prepare an adhesive composition. The solid content of the adhesive composition was 99 wt % or more.

Example 2

The acrylic resin E prepared by Preparation Example 5 was heated to 130° C. under a reduced pressure atmosphere to volatilize a polymerization solvent to prepare an adhesive composition including the acrylic resin E. The solid content of the adhesive composition was 99 wt % or more.

Example 3

The acrylic resin F prepared by Preparation Example 6 was heated to 130° C. under a reduced pressure atmosphere to volatilize a polymerization solvent to prepare an adhesive composition including the acrylic resin F. The solid content of the adhesive composition was 99 wt % or more.

Example 4

The acrylic resin G prepared by Preparation Example 7 was heated to 130° C. under a reduced pressure atmosphere to volatilize a polymerization solvent to prepare an adhesive composition including the acrylic resin G. The solid content of the adhesive composition was 99 wt % or more.

Example 5

The acrylic resin H prepared by Preparation Example 8 was heated to 130° C. under a reduced pressure atmosphere to volatilize a polymerization solvent to prepare an adhesive composition including the acrylic resin H. The solid content of the adhesive composition was 99 wt % or more.

Example 6

The acrylic resin I prepared by Preparation Example 9 was heated to 130° C. under a reduced pressure atmosphere to volatilize a polymerization solvent to prepare an adhesive composition including the acrylic resin I. The solid content of the adhesive composition was 99 wt % or more.

The physical properties of the adhesive compositions prepared in Examples 1-6 and Comparative Examples 1-3 were measured by the methods below. The measured results are shown in [Table 2] below.

Measurement Methods of Physical Properties (1) Coating Viscosity (Unit: Pa·s)

Each of the adhesive compositions prepared in the Examples and the Comparative Examples was heated to 120° C. for melting, and 10.5 ml of a sample by was taken. Then, by using a Brookfield viscometer (RVDV2T, manufacturer: Brookfield), the viscosity was measured under 0.7 rpm conditions using a SC4-27 spindle.

(2) Cohesiveness (Unit: N/12.7 mm)

Each of the adhesive compositions prepared in the Examples and the Comparative Examples was heated to 120° C. for melting, and a sticky coating layer was formed so that a coating weight was 10 g/m$^2$ on a release treatment surface of a polyethyleneterephthalate film (release PET) with a thickness of 38 μm using a slot die coater, and then, a biaxially oriented polypropylene film (BOPP) with a thickness of 50 μm was laminated. Then, the polyethyleneterephthalate film was removed, and irradiation was performed with a light amount of 44 mJ/cm$^2$ using a UV irradiator (manufacturer: Lichtzen Co., metal halide lamp) with a wavelength region of UV-C (200 to 280 nm) for curing the sticky coating layer. Then, the release surface of the polyethyleneterephthalate film (release PET) with a thickness of 38 μm was laminated. The adhesive film manufactured by the above-described method was stored for 7 days and a specimen for measuring adhesiveness was manufactured.

Particularly, a polyethylene film (release PE film) of an aluminum sticky tape with a thickness of 50 μm (manufacturer: Coroplast) was removed, and laminated on the biaxial oriented polypropylene film (BOPP) side of the adhesive film, and then, was cut into a size of a width of 12.7±0.1 mm and a length of 110 mm to manufacture strips. Then, from one end of the strip, the polyethyleneterephthalate film (release PET) of the adhesive film was removed to the length of 12.7±0.1 mm, and the adhesive film was attached to alkali-free glass with a width of 30 mm and a height of 50 mm using a roller of 2 kg according to the regulation of JIS Z 0237 to manufacture a specimen.

The specimen for measurement, manufactured by the above-described method was stored in constant temperature and constant humidity conditions (23° C., 50% R.H.) for 20 minutes. Then, the adhesive film was pulled with a rate of 5 mm/min in a horizontal direction with the plane direction of a glass substrate using a TA apparatus (Texture Analyzer, Stable Micro System Ltd., England), and the force required for separating the adhesive film from the glass substrate was measured, and this force was evaluated as the adhesiveness.

(3) Adhesiveness (Unit: N/25 mm)

Each of the adhesive compositions prepared by the Examples and the Comparative Examples was heated to 120° C. for melting, and a sticky coating layer was formed so that a coating weight was 10 g/m$^2$ on a release treatment surface of a polyethyleneterephthalate film (release PET) with a thickness of 38 μm using a slot die coater, and then, a biaxially oriented polypropylene film (BOPP) with a thickness of 50 μm was laminated. Then, the polyethyleneterephthalate film was removed, and irradiation was performed with a light amount of 44 mJ/cm$^2$ using a UV irradiator (manufacturer: Lichtzen Co., metal halide lamp) with a wavelength region of UV-C (200 to 280 nm) for curing. Then, the release surface of the polyethyleneterephthalate film with a thickness of 38 μm was laminated. The adhesive film manufactured by the above-described method was stored for 7 days and a specimen for measuring adhesiveness was manufactured.

Particularly, the adhesive film was cut into a strip having a width of 25 mm and a length of 130 mm, the polyethyleneterephthalate film was exfoliated, and the adhesive film was attached to alkali-free glass using a roller of 2 kg according to the regulation of JIS Z 0237 to manufacture a specimen.

Then, the specimen for measurement was stored in constant temperature and constant humidity conditions (23° C., 50% R.H.) for 20 minutes, and for 24 hours. Then, the adhesive film was pulled with an exfoliation rate of 300 mm/min and an exfoliation angle of 180 degrees using a TA apparatus (Texture Analyzer, Stable Micro System Ltd., England), and the force required for separating the adhesive film from a glass substrate was measured.

(4) Thermal Stability

Each of the adhesive compositions prepared by the Examples and the Comparative Examples was filled in a box of which inner part was formed using a release film and outer part was formed using a paper, from the bottom up to 1 cm or higher, and the box containing the adhesive composition was put in a steel container, deaerated at 150° C. under a reduced pressure, and aged for 24 hours. Then, a wooden rod was submerged in the adhesive composition and then pulled up slowly while forming a thin film, and the number of gel particles was measured with the naked eye to evaluate the thermal stability. A case where the number of gel particles was less than 7 was evaluated as OK, and a case where the number of gel particles was 7 or more was evaluated as NG.

TABLE 2

|  | Example | | | | | | Comparative Example | | |
|---|---|---|---|---|---|---|---|---|---|
|  | 1 | 2 | 3 | 4 | 5 | 6 | 1 | 2 | 3 |
| Acrylic resin | A | E | F | G | H | I | B | B + C | B + D |
| Coating viscosity [Pa · s] | 66 | 106 | 70 | 62 | 87 | 64 | 213 | 86 | 72 |
| Cohesiveness [N/12.7 mm] | 85.9 | 84.3 | 83.1 | 87.6 | 85.1 | 84.4 | Unmeasurable | 68.7 | 77.3 |
| adhesiveness [N/25 mm] After 20 min | 7.0 | 6.9 | 6.8 | 6.8 | 7.1 | 7.0 | Unmeasurable | 7.7 | 7.3 |
| After 24 hr | 7.9 | 7.8 | 7.7 | 7.5 | 8.0 | 7.8 | Unmeasurable | 8.5 | 8.2 |
| Thermal stability | OK | OK | OK | OK | OK | OK | OK | OK | NG |

As shown in [Table 2], the adhesive compositions of Examples 1-6 using the acrylic resins having the branch-type polymer structure according to the present invention were found to have a low viscosity (coating viscosity) in a molten state, excellent thermal stability and excellent cohesiveness and adhesiveness after forming an adhesive layer.

In contrast, the adhesive composition of Comparative Example 1, using only the acrylic resin having a linear polymer structure was found to have a too high viscosity (coating viscosity) in a molten state and the formation of an adhesive layer was impossible. The adhesive composition of Comparative Example 2, in which a linear acrylic resin having a high molecular weight and a linear acrylic resin having a low molecular weight were mixed and used, showed somewhat improved coating viscosity by the mixing with a resin having a low weight average molecular weight, but since the ratio of the acrylic resin having a high molecular weight, which influenced photocuring efficiency after forming an adhesive layer, was low, the photocuring efficiency was decreased, and the cohesiveness was markedly decreased. Meanwhile, the adhesive composition of Comparative Example 3, which used a mixture of an linear acrylic resin having a high molecular weight and an acrylic resin having a low molecular weight, showed improved coating viscosity properties by the mixing with the acrylic resin having a low molecular weight as in Comparative Example 2, but when compared with the adhesive compositions of the Examples, the cohesiveness was low, and the branch-type acrylic resin having a low molecular weight induced gelation during an aging process to deteriorate thermal stability.

The invention claimed is:

1. A photocurable acrylic resin,
wherein the photocurable acrylic resin is a polymer of a monomer mixture comprising a crosslinkable monomer represented by the following [Formula 1]; a (meth)acrylic monomer comprising a photoinitiating functional group; and an alkyl (meth)acrylate-based monomer,
wherein the photocurable acrylic resin has a weight average molecular weight of 100,000 to 500,000, and a branch-type polymer structure:

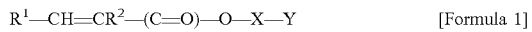
[Formula 1]

in Formula 1, $R^1$ is hydrogen, a C1-C6 alkyl group or a C2-C6 alkenyl group, $R^2$ is hydrogen or a C1-C10 alkyl group, X is a single bond, a C1-C10 alkylene group, a C2-C10 alkenylene group, ether, ester, or a combination thereof, and Y is a vinyl group, an allyl group, or a C3-C10 cycloalkenyl group, and
wherein the monomer mixture comprises, based on 100 parts by weight of the monomer mixture:
0.01 to 3 parts by weight of the crosslinkable monomer represented by [Formula 1];
0.01 to 5 parts by weight of the (meth)acrylic monomer comprising the photoinitiating functional group; and
92 to 99 parts by weight of the alkyl (meth)acrylate-based monomer.

2. The photocurable acrylic resin according to claim 1, wherein the photocurable acrylic resin has a viscosity measured at 23° C. of 8,000 cP or less after being diluted by adding ethyl acetate to a solid concentration of 58 wt %.

3. The photocurable acrylic resin according to claim 1, wherein the crosslinkable monomer represented by Formula 1 is one or more selected from the group consisting of allyl methacrylate, allyl acrylate, methallyl methacrylate, methallyl acrylate, 3-butenyl acrylate, but-3-enyl-2-methylprop-2-enoate, 2-allyloxyethyl acrylate, 2-allyloxyethyl methacrylate, 3-allyloxypropyl methacrylate, 3-allyloxypropyl acrylate, 2-allyloxyethoxyethyl methacrylate, 2-allyloxyethoxyethyl acrylate, cyclohex-2-enyl acrylate, cyclohex-2-en-1-yl 2-methylprop-2-enoate and 3-vinylcyclohex-2-enyl acrylate.

4. The photocurable acrylic resin according to claim 1, wherein the (meth)acrylic monomer comprising the photoinitiating functional group is one or more selected from the group consisting of a benzophenone-based (meth)acrylic monomer and a benzoin-based (meth)acrylic monomer.

5. The photocurable acrylic resin according to claim 1, wherein the monomer mixture further comprises a (meth)acrylic monomer having a polar functional group.

6. The photocurable acrylic resin according to claim 5, wherein the monomer mixture comprises, based on 100 parts by weight of the monomer mixture:
0.01 to 3 parts by weight of the monomer represented by [Formula 1];
0.01 to 5 parts by weight of the (meth)acrylic monomer comprising the photoinitiating functional group;
0.1 to 20 parts by weight of the (meth)acrylic monomer having a polar functional group; and
72 to 98 parts by weight of the alkyl (meth)acrylate-based monomer.

7. An adhesive composition comprising the photocurable acrylic resin according to claim 1.

8. The adhesive composition according to claim 7, wherein the adhesive composition has a viscosity at 120° C. of 20 to 140 Pas.

9. The adhesive composition according to claim 7, wherein the adhesive composition comprises 90 wt % or more of the photocurable acrylic resin.

10. The adhesive composition according to claim 7, wherein the adhesive composition is a solvent free type adhesive composition.

11. The adhesive composition according to claim 7, wherein the adhesive composition is a hot melt adhesive composition.

12. An adhesive film, comprising the adhesive composition according to claim 7 and a base.

* * * * *